Sept. 8, 1959 J. T. ROMINGER 2,903,206
LANDING GEAR LOCKING DEVICE
Filed March 12, 1957 2 Sheets-Sheet 2
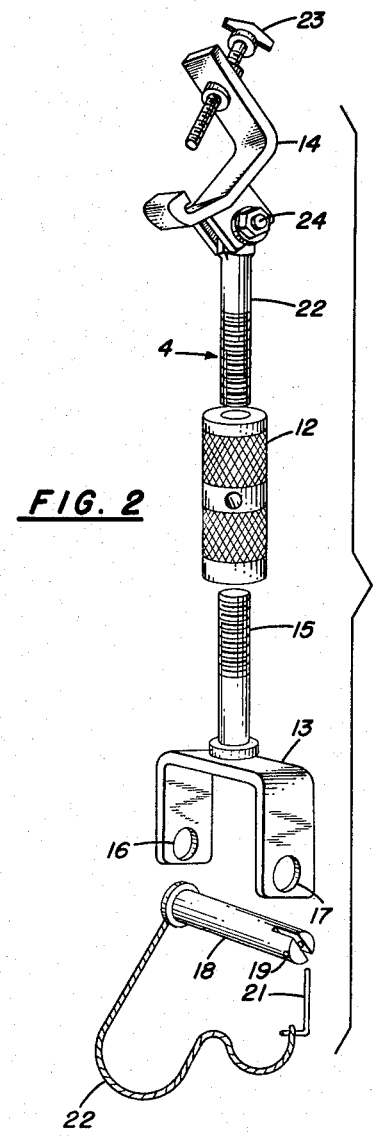
FIG. 2
INVENTOR.
JAMES T. ROMINGER
BY
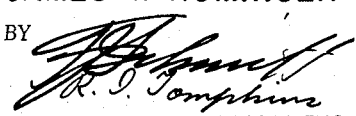
ATTORNEYS United States Patent Office 2,903,206
Patented Sept. 8, 1959

2,903,206

LANDING GEAR LOCKING DEVICE

James T. Rominger, Pensacola, Fla.

Application March 12, 1957, Serial No. 645,650

8 Claims. (Cl. 244—102)

(Granted under Title 35, U.S. Code (1952), sec. 266)

The invention described herein may be manufactured and used by or for the Government of the United States of America for governmental purposes without the payment of any royalties thereon or therefor.

The present invention relates to a landing gear locking device and more particularly to a landing gear locking device which is used in case of an emergency when the standard downlock mechanism for a landing gear is broken or malfunctioning.

In the past, when the main landing gear mechanism of a Lockheed Super Constellation aircraft or other aircraft having similar landing gear mechanism would not lock in the down position during a landing approach, an extremely hazardous method was used to hold the landing gear in the extended position until the necessary repairs were made. For example, the landing gear of the Lockheed Super Constellation aircraft does not normally go beyond vertical center in its extended position. Therefore, it was necessary when the down lock mechanism did not function properly to hold the landing gear down with hydraulic pressure acting on the actuating strut and by static thrust of the propellers, which were controlled by skillful manipulation of the brakes and the throttle after the aircraft's wheels had engaged the landing strip, during the roll out, and after the aircraft had stopped. After the aircraft had landed, ground personnel placed the aircraft on wing jacks, an extremely precarious and hazardous operation because the engines were turning over at a speed of approximately 1450 r.p.m. in order to drive the hydraulic system pump sufficiently to create enough pressure in the hydraulic system to hold the landing gear in the extended position, and because during the transitional period of transferring the weight from the wheels to the jacks, the engine power and the brakes had to be carefully and gradually reduced to avoid upsetting the aircraft. Further, after the aircraft was on the jacks, temporary or permanent repairs had to be made on the runway before the aircraft could be taxied away. It is readily understood that the old operation described above had two major disadvantages: that men had to be under the aircraft for several hours in constant danger due to the possibility of the aircraft falling on them, and that the runway involved had to be closed to other traffic during the repair operation.

In the present invention, the disadvantages of the old procedure noted above are overcome by providing a landing gear locking device which is used temporarily to supplant a malfunctioning down lock mechanism by holding the upper and the lower landing gear drag links in proper and rigid alignment when the main landing gear is in the extended position. The major advantage of the present invention is the comparative safety it affords to the ground personnel. Not only does it reduce the time the personnel are exposed to hazard from two to three hours, to approximately five minutes but it also requires not more than two men to install the device whereas a minimum of four men were required under the aircraft in placing it on jacks. Further, the hazard to the aircraft is also reduced proportionately.

An object of the present invention is the provision of a landing gear locking device which temporarily replaces a malfunctioning down lock mechanism connected to a landing gear.

Another object is to provide a landing gear locking device which alleviates the extreme hazard to personnel and equipment in repairing a malfunctioning landing gear upon landing.

A further object of the invention is the provision of a landing gear locking device that can be quickly installed on a malfunctioning landing gear to enable a runway to be reopened to other traffic in a minimum amount of time.

Other objects and many of the attendant advantages of this invention will be readily appreciated as the same becomes better understood by reference to the following detailed description when considered in connection with the accompanying drawings wherein:

Fig. 2 shows an exploded perspective view of a preferred embodiment of the invention.

Figure 1:
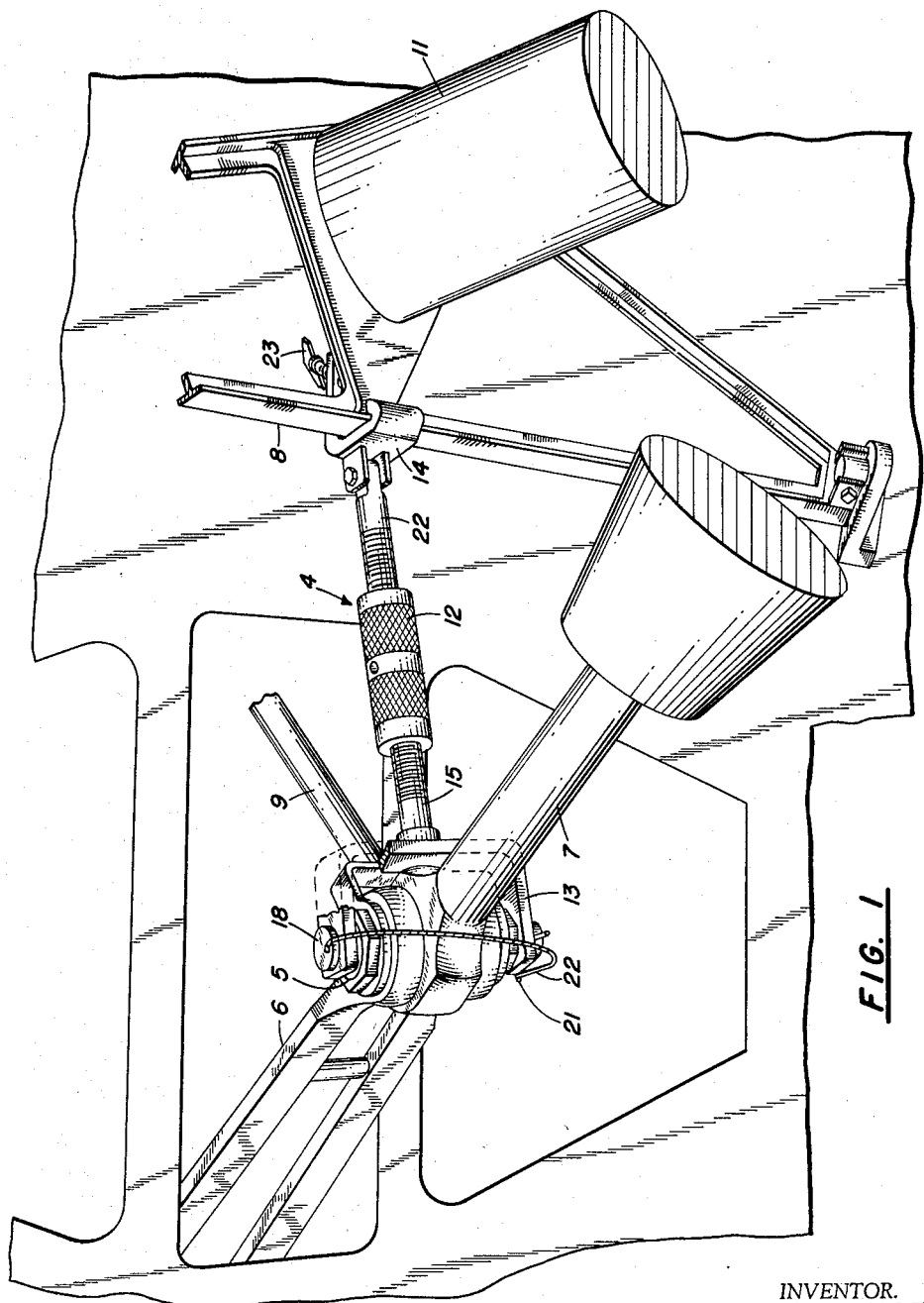
Fig. 1 is a perspective view of part of a landing gear mechanism and showing the device of the present invention installed.

Referring now to the drawings, wherein like reference characters designate like or corresponding parts throughout the several views, there is shown in Fig. 1 a landing gear locking device 4 having one end engaged to a hollow bearing shaft 5 which is the common hinge point connecting an upper landing gear drag link 6 and a lower landing gear drag link 7, and the other end secured to the center of a main landing gear yoke 8. A down lock hook strut 9 is also connected to the common hinge point connecting the upper and lower links 6 and 7. The strut 9 is connected to a down lock hook mechanism (not shown). A main strut 11 is connected to the yoke 8 and together with the lower drag link 7 forms part of a landing gear mechanism that supports a wheel (not shown).

Referring to Fig. 2, the landing gear locking device 5 is shown having a turnbuckle 12 connecting a clevis 13 and a C-clamp 14. The clevis 13 is adjustably connected at one end to the turnbuckle 12 by means of a threaded rod 15 and has the other end provided with openings 16 and 17 to receive a pin 18. The pin 18 has small holes 19 through one end thereof to receive a safety pin 21 which is secured to the other end of the pin 18 by means of a cord 22.

The C-clamp 14 is adjustably connected at one end to the turnbuckle 12 by means of a threaded rod 22 and has a wing headed screw 23 threadedly received in the other end. An adjustable connection 24 is provided between the C-clamp and the rod 22 to allow the C-clamp 14 to be set in various positions.

It is to be understood that the turnbuckle 12 threadedly mates with rods 15 and 22 in the common right and left screwlink arrangement so that the clevis 13 and the C-clamp 14 move in opposite directions when the turnbuckle 12 is turned.

When an aircraft lands with a malfunctioning landing gear down lock mechanism (not shown) which operates the strut 9, it is readily apparent that the links 6 and 7 cannot be locked into the proper position to enable the landing gear to be fully extended. Thus, the only means used heretofore to correct this condition was placing the aircraft on jacks which, as explained hereinabove, created a very hazardous condition.

As can best be seen in Fig. 1, the landing gear locking device 4 can be quickly installed to supplant the malfunctioning landing gear down lock mechanism by: placing the clevis around the hollow bearing shaft 5 until the openings 16 and 17 in the clevis 13 are in alignment with the hollow shaft 5 and passing the pin 18 through the opening 16, the hollow shaft 5, and the opening 17. The safety pin 21 is then passed through the small holes 19 in one end of the safety pin 18. The turnbuckle 12 can be turned either extending or retracting the C-clamp 14 until the proper position is attained for the C-clamp 14 to be secured to the yoke 8.

After the locking mechanism 4 has been installed, there is no longer any need for hydraulic pressure and the engine speed can be reduced to an idle condition. This would relieve the pressure put on strut 9 and the locking device 4 would then be the only means locking the links 6 and 7 in the extended position.

It is therefore seen that when an aircraft can get its landing gear down but it cannot be locked in the down position, the locking device 4 can be installed by the ground personnel in a matter of a few minutes while the gear is held in the down position by hydraulic pressure. The locking device 4 prevents collapse of the landing gear and the aircraft can then be taxied to a hangar with the locking device installed.

Obviously many modifications and variations of the present invention are possible in the light of the above teachings. It is therefore to be understood that within the scope of the appended claims the invention may be practiced otherwise than as specifically described.

What is claimed is:

1. In a landing gear locking device to be used to supplant a malfunctioning landing gear down lock mechanism for locking in the down position a landing gear having an upper and lower drag link hingedly connected by a hollow bearing shaft and a landing gear yoke the combination comprising a turnbuckle, clevis means adjustably connecting one end of said turnbuckle to said hollow bearing shaft, and C-clamp means adjustably connecting the other end of said turnbuckle to said landing gear yoke whereby said upper and lower drag links are locked in the extended position when said landing gear down lock mechanism is mulfunctioning.

2. In a landing gear locking device to be used to supplant a malfunctioning landing gear down lock mechanism for locking in the down position a landing gear having an upper and lower drag link hingedly connected by a hollow bearing shaft and a landing gear yoke, the combination comprising a turnbuckle, a clevis adjustably connected to one end of said turnbuckle, means connecting said clevis to said hollow bearing shaft, a C-clamp having an adjustable connection thereon, means adjustably connecting the other end of said turnbuckle to said adjustable connection on said C-clamp, said C-clamp engaging the landing gear yoke whereby said upper and lower drag links are locked in the extended position when said landing gear down lock mechanism is malfunctioning.

3. In a landing gear locking device to be used to supplant a malfunctioning landing gear down lock mechanism for locking in the down position a landing gear having an upper and lower drag link hingedly connected by a hollow bearing shaft and a landing gear yoke, the combination comprising a turnbuckle, a clevis adjustably connected to one end of said turnbuckle, said clevis having aligned openings therethrough, said clevis positioned around said hollow bearing shaft with said openings in alignment with the hollow shaft, a pin placed through said openings and said hollow shaft, and a C-clamp adjustably connected to the other end of said turnbuckle, said C-clamp engaging the landing gear yoke, whereby said upper and lower drag links are locked in the extended position when said landing gear down lock mechanism is malfunctioning.

4. In a landing gear locking device to be used to supplant a malfunctioning landing gear down lock mechanism for locking in the down position a landing gear having an upper and lower drag link hingedly connected by a hollow bearing shaft and a landing gear yoke, the combination comprising a turnbuckle, a clevis adjustably connected to one end of said turnbuckle, said clevis having aligned openings therethrough, said clevis positioned around said hollow bearing with said openings in alignment with the hollow shaft, a pin placed through said openings and said hollow shaft, a rod having one end adjustably connected to the other end of said turnbuckle, a C-clamp having an adjustable connection thereon, the other end of said rod connected to said adjustable connection on said C-clamp, said C-clamp engaging said landing gear yoke whereby said upper and lower drag links are locked in the extended position when said landing gear down lock mechanism is malfunctioning.

5. The combination set forth in claim 4 wherein said pin has small holes therethrough, and a safety pin inserted through said holes to securely fasten the clevis to said shaft.

6. A device of the character described comprising a landing gear having an upper drag link and a lower drag link hingedly connected by a hollow bearing shaft and a landing gear yoke, a lock mechanism for locking said landing gear in a gear down position, said lock mechanism comprising a turnbuckle, clevis means adjustably connecting one end of said turnbuckle to said hollow bearing shaft, and C-clamp means adjustably connecting the other end of said turnbuckle to said landing gear yoke whereby said upper and lower drag links are locked in the extended position when said landing gear down lock mechanism is malfunctioning.

7. A device of the character described comprising a landing gear having an upper drag link and a lower drag link hingedly connected by a hollow bearing shaft and a landing gear yoke, a lock mechanism for locking said landing gear in a gear down position, said locking mechanism comprising a turnbuckle, a clevis adjustably connected to one end of said turnbuckle, said clevis having aligned openings therethrough, said clevis positioned around said hollow bearing with said openings in alignment with the hollow shaft, a pin placed through said openings and said hollow shaft, a rod having one end adjustably connected to the other end of said turnbuckle, a C-clamp having an adjustable connection thereon, the other end of said rod connected to said adjustable connection on said C-clamp, said C-clamp engaging said landing gear yoke whereby said upper and lower drag links are locked in the extended position when said landing gear down lock mechanism is malfunctioning.

8. The combination set forth in claim 7 wherein said pin has small holes therethrough, and a safety pin inserted through said holes to securely fasten the clevis to said shaft.

References Cited in the file of this patent

UNITED STATES PATENTS

| 2,403,828 | Rawlins et al. | July 9, 1946 |
| 2,532,168 | Jakoubek | Nov. 28, 1950 |
| 2,696,359 | Hill | Dec. 7, 1954 |

FOREIGN PATENTS

| 867,254 | France | July 15, 1941 |

UNITED STATES PATENT OFFICE
CERTIFICATE OF CORRECTION

Patent No. 2,903,206                                                           September 8, 1959

James T. Rominger

It is hereby certified that error appears in the printed specification of the above numbered patent requiring correction and that the said Letters Patent should read as corrected below.

Column 3, line 40, for "mulfunctioning" read -- malfunctioning --; column 4, line 41, for "locking" read -- lock --.

Signed and sealed this 29th day of March 1960.

(SEAL)
Attest:

KARL H. AXLINE
Attesting Officer

ROBERT C. WATSON
Commissioner of Patents